Aug. 24, 1943.  F. KOCH  2,327,531
CONTINUOUS MILLING
Filed July 27, 1940  2 Sheets-Sheet 1

Frederick Koch,
INVENTOR.
BY
Philip S. McLean
ATTORNEY.

Aug. 24, 1943.  F. KOCH  2,327,531
CONTINUOUS MILLING
Filed July 27, 1940  2 Sheets-Sheet 2
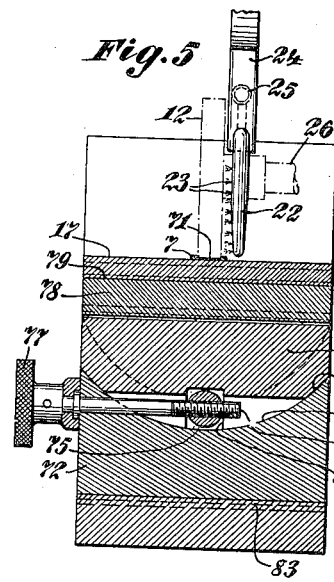
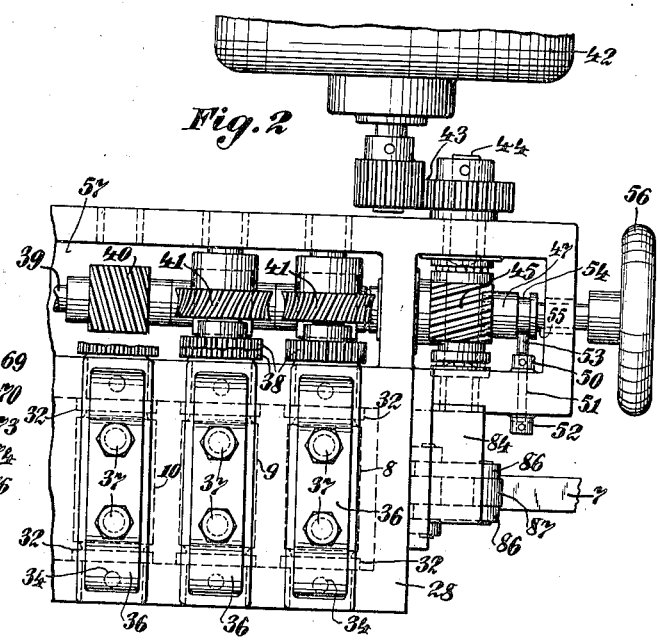
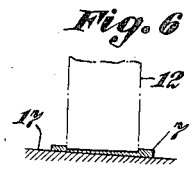
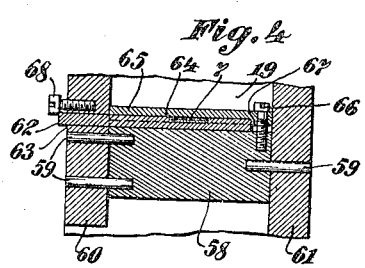
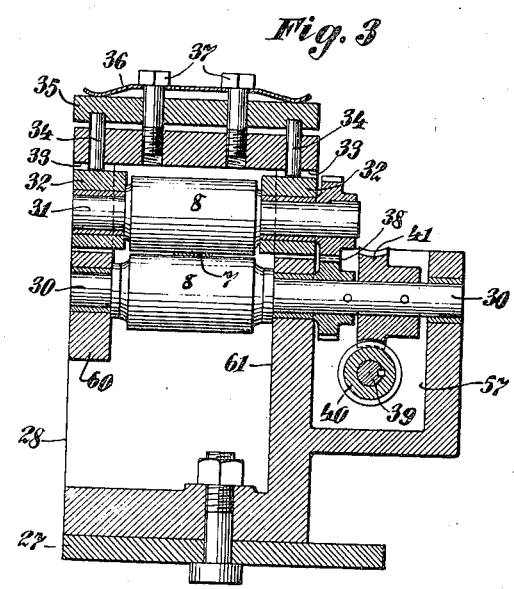
Frederick Koch,
INVENTOR.
BY
ATTORNEY.

Patented Aug. 24, 1943

2,327,531

UNITED STATES PATENT OFFICE 2,327,531

CONTINUOUS MILLING

Frederick Koch, Sparta, N. J., assignor to Associated Patentees, Inc., Ampere, N. J., a corporation of New Jersey Application July 27, 1940, Serial No. 347,903

5 Claims. (Cl. 90—21)

The invention here disclosed relates to the milling of stock in continuous lengths, such as for example, the milling of a continuous groove in flat strip stock.

Special objects of the invention are to provide a machine for continuous milling operations which may be readily converted and set up for operating on stock of different cross-sectional shapes, which will be accurate and rapid in operation, readily adjustable to meet different requirements and which will be self-protective in the sense of automatically shutting off before the end of the stock being acted upon can reach the cutter.

Other objects of the invention are to provide a sturdy reliable form of machine of simple design and relatively low cost, which will operate automatically and smoothly to accomplish different forms of cuts desired.

Additional objects and the novel features of invention by which the purposes of the invention are attained will appear and are hereinafter set forth.

The drawings accompanying and forming part of the following specification illustrate one of the practical commercial embodiments of the invention. The structure however may be modified and changed as regards this particular disclosure, all within the true intent and broad scope of the invention as hereinafter defined and claimed.

Fig. 2 is a broken partial top plan view of the feeding in end of the machine.

Fig. 3 is a vertical cross-sectional view as substantially on the plane of line 3—3 of Fig. 1.

Fig. 4 is a broken sectional detail as on line 4—4 of Fig. 1.

Fig. 5 is a broken sectional view substantially on the line 5—5 of Fig. 1.

Fig. 6 is a part sectional diagrammatic view showing how by tilting the anvil the cutter can be made to take a deeper cut at one side of the strip than at the other.

Figure 1:
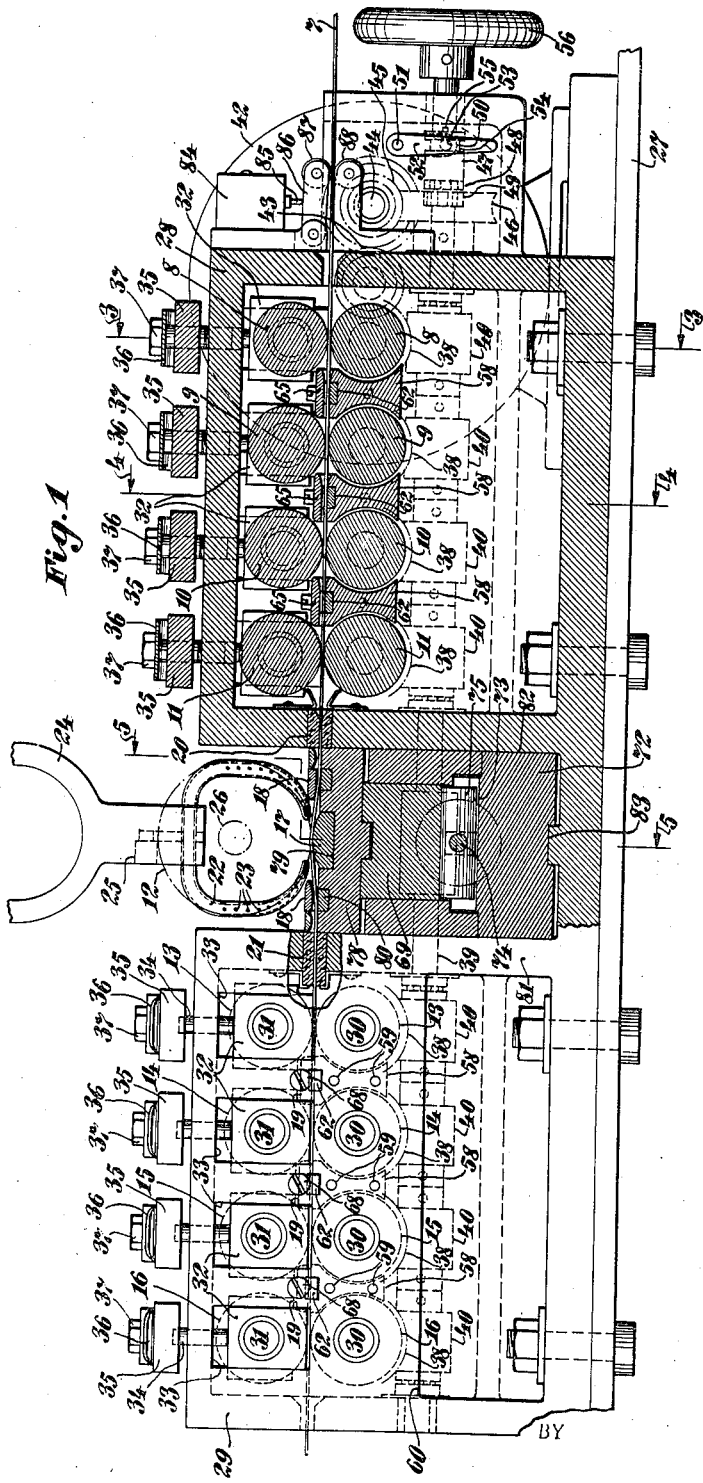
Fig. 1 is a broken part sectional and part side elevation view of one of the commercial embodiments of the invention.

In the illustration, the machine is shown as set up for milling a longitudinal groove in a length of flat strip stock 7.

As shown in Fig. 1, the stock is taken into the machine at the right by a first pair of feed rolls 8, and successively advanced by sets of feed rolls 9, 10, 11, of a first group to a milling cutter 12, and then advanced by successive feed rolls 13, 14, 15, 16, of a second group, out of the machine at the left.

The successive pairs of feed rolls operate progressively at slightly increased linear speed, thus to continuously tension the strip in its passage through the machine. The illustration shows, somewhat exaggerated, how the progressive increase in speed may be attained by making the successive pairs of feed rolls of slightly greater diameters.

The feed rolls are shown arranged to advance the strip in a straight line.

At the intermediate, cutter station, the tensioned strip is deflected or arched up over a rounded anvil block 17. Holddown guides 18, at opposite sides of this block confine and guide this portion of the strip in properly arched relation.

Box guides 19, between the successive pairs of feed rolls, direct and control the strip in passage from one set of rolls to the next.

Dust pads are shown at 20, 21 for wiping the strip clean before and after passing over the anvil 17, beneath the cutter 12.

To lubricate, cool and wash clear any cuttings that might otherwise get under the strip and throw it out of line in passing over the anvil, there is provided, in the illustration, a pressure spray system, including a hollow yoke or arch 22, perforated at 23, along the general contour of the cutter and supported so as to direct individual sprays across between the teeth of the cutter. This spray head is shown carried by a supporting yoke 24, cored or bored as indicated at 25, to carry the oil or other suitable fluid under pressure, to the spray head.

Details of the cutter 12 and the arbor 26, on which it is mounted are not shown, since these may constitute parts of a standard milling machine. The supporting yoke 24, for the spray head is indicated in Fig. 1, as adapted for mounting on the overarm of such a standard type milling machine and consistent with such practice, the entire strip handling mechanism of the present invention is indicated as mounted on a single base 27, which can be cooperatively related with the cutter and overarm structure of a regular milling machine, thus placing the invention in the category of an attachment or accessory available for milling machines now in general use.

The base structure is of special design, involving two upstanding box frames 28, 29, mounting the two sets of feed rolls and spaced at the center to provide a well for the cutter, holddown guides and anvil mechanism. The lower feed rolls are shown in Fig. 3 as carried by shafts 30, journalled in fixed bearings in the box frames and the upper rolls are shown as carried by shafts 31, journalled in blocks 32, vertically shiftable in guides 33, and engaged by the thrust pins 34, slidingly guided in the top of the frames and acted on by pressure bars 35, engaged by arched springs 36, confined by the tensioning and guiding bolts 37. The upper and lower roll shafts are geared together at 38, and all are driven from a longitudinally extending shaft 39, carrying worms 40, in mesh with worm gears 41, on the lower roll shafts 30.

Operation of the roll driving shaft 39, is effected in the illustration from a motor 42, connected by reduction gearing 43, with a cross shaft 44, carrying a worm 45, in mesh with a worm gear 46, on shaft 39.

To permit hand turning of shaft 39, and hence manual operation and adjustment of the feed rolls, a throw-out clutch is provided in the form of a sleeve 47, slidingly keyed on shaft 39, and having clutch jaws 48, for cooperation with corresponding clutch teeth or jaws 49, on the worm gear 46, which for purposes of such clutch control is rotatably mounted on shaft 39. The jaw clutch sleeve 47, is shown as shiftable by a lever 50, on the inner end of a rock shaft 51, carrying a handle 52, at its outer end, said lever carrying a pin 53, engaging in an annular groove 54, in said clutch sleeve. By rocking the clutch handle 52, to the right in Fig. 1, it will be seen that the clutch sleeve can be shifted on the key or spline 55, to uncouple said sleeve from the loose worm gear 46, thus to enable the main drive shaft 39, to be turned by a hand wheel 56, on the end of such shaft.

Lubrication of practically all gearing is provided in the illustration by forming the base with a grease trough 57, receiving and surrounding the shaft 39, and the gears associated therewith.

The stock guides are preferably made readily removable and interchangeable to suit different cross-sectional shapes of material operated upon.

In the present illustration, where flat strip stock is the material operated on, the strip guides are constructed as shown in Fig. 4, with base blocks 58, removably secured by pins 59, between the spaced front and back walls 60, 61, of the box frames, and slides 62, entered through opening 63, in the front wall over the top of such base blocks, said slides being grooved at 64, to the particular cross-sectional shape of the stock and these grooves being closed at the top by cover plates 65. The latter are indicated as secured by holddown screws 66 and the grooved guide slides 62 are shown as secured and as thrust up against positioning shoulders 67, on the cover plates by thrust screws 68. Upon loosening the holddown screws 66, and removing the seating screws 68, the guide slides can be readily taken out and be replaced by other slides, for instance, having differently shaped stock guiding grooves.

In the machine illustrated, the anvil is mounted so that it may be rocked transversely of the stock feed, for instance, to make the cutter cut deeper at one edge or as in some instances, to compensate for a cutter that in sharpening has been ground to less diameter at one face than at the other.

This feature of transverse adjustment of the anvil is illustrated in Fig. 5, and one result of such adjustment, that is to produce a deeper cut at one side and consequently tapered cross-section is indicated in Fig. 6.

The anvil 17, is shown seated in a block 69, curved at the back or bottom on a radius 70, drawn from a center 71, at the middle of the cutter and substantially one-half the stock thickness above the anvil. The base 72, of the anvil unit has a correspondingly curved seat 73, and a fine angular or rocking adjustment is accomplished by means of a screw 74, engaged in a roll 75, rockingly held in a groove 76, in the bottom of the anvil pillow block 69. The screw 74, is extended out through the front of the unit and provided with a suitable adjusting knob or handle 77.

For convenience of manufacture, the rocking base of the anvil may be made in two parts as indicated, the lower or bottom part having the arcuate bearing surface and the upper detachable part 78, having transverse nests or seats 79 and 80, for the anvil and for the holddown guides 18, at opposite sides of the anvil. The base 72, which carries the arcuate seat 73, is shown as removably seated between the opposing end walls 81, 82, of the box frames, over a positioning rib 83. With this construction, the entire adjustable anvil assembly can be removed or be replaced as a unit. The anvils and holddown guides are separately removable so that different forms of these parts may be interchanged and replaced.

By means of the adjusting screw 74, the anvil piece may be rocked to different transversely inclined positions, thus to locate the strip passing beneath the cutter either level or variously inclined toward one or the other edge of the same. As a result, the cutter may be caused to cut deeper at one edge or the other, or to produce various tapered cross-sectional shapes, such as indicated at Fig. 6. Another primary use and advantage of this transverse adjustment is to compensate for any variations in the cutter, which otherwise might cause the cutter to mill deeper than it should at either one or the other edge of the stock.

The transverse adjustment of the anvil puts more or less of a twist in the stock in between the last pair of rolls 11, of the first group and the first pair of rolls 13, in the second group. Because of the overfeeding and tensioning effect of the successive pairs of rolls however, this is no disadvantage. The holddown guides at opposite sides of the anvil keep the stock from twisting where it passes over the anvil and confines such twist as there may be, between said holddown guides and the feed rolls adjacent thereto.

The progressive overfeed maintains the stock in a continuously taut condition, in which the cutter can operate at high speed and with great accuracy, even on thin strip stock. The continuous pressure washing of the cutter, strip and anvil, keeps the strip and anvil clean and particularly prevents any cuttings from working up between the anvil and stock.

To prevent possibility of the end of a tensioned length of stock from being snapped up beneath the cutter and injuring parts or causing other trouble, there is provided in the present disclosure a "micro switch" at 84, Figs. 1 and 2, having a plunger 85, bearing on the pivoted arm 86, of a detector roll 87, which rides on the stock where it passes over the guide roll 88, at the entrance to the machine. As soon as the end of the strip feeding from a reel or other source of supply passes beneath the roll 87, the latter drops and trips the micro switch 84, to stop the machine.

Thus the machine is automatically stopped before the end of a length of stock can reach the cutter.

While shown operating to cut a groove in flat strip stock—it will be realized that with different cutters, guides, anvils and feed rolls, all kinds of continuous milling can be performed on all different kinds of stock. For convenience, this may be referred to generally as strip stock, it being understood that this term is used to comprehend such stock materials as might ordinarily be termed wire, rod and the like.

The succession of feed rolls and the independent adjustment of pressure at each pair of feed rolls enables tensioning of the stock to the extent necessary for the particular operations under way. A certain amount of slippage necessarily results from the progressively greater feeding speeds of the different sets of rolls, but by proper adjustment of pressure at the different pairs of rolls, such slippage may be distributed and made more or less uniform with resulting smooth, easy and at the same time, rapid action. The enclosure or partial enclosure of the main drive shaft and the spiral or worm gear drive to the feed rolls assures constant ample lubrication of such parts.

What is claimed is:

1. A continuous milling machine, comprising in combination, a succession of cooperating feed rolls operating at progressively greater linear speeds for tensioning stock fed thereby and a milling cutter disposed between successive cooperating feed rolls and positioned to operate on the stock tensioned and fed thereby, an anvil opposed to said cutter and disposed to deflect the tensioned stock toward said cutter and means for angularly setting said anvil about an axis located in the region of said cutter and longitudinal of the direction of feed to incline the tensioned stock in respect to said cutter.

2. A continuous milling machine, comprising in combination, a succession of cooperating feed rolls operating at progressively greater linear speeds for tensioning stock fed thereby and a milling cutter disposed between successive cooperating feed rolls and positioned to operate on the stock tensioned and fed thereby, an anvil opposed to said cutter and disposed to deflect the tensioned stock toward said cutter, hold-down guides for the stock at opposite sides of said anvil, an anvil block having seats receiving and confining said anvil and said holddown guides at the opposite sides of said anvil and means for adjustably mounting said anvil and holddown guide supporting block in respect to said cutter to rock transversely of the stock feed about an axis in the locality of the cutting edge of said cutter.

3. A continuous milling machine, comprising spaced pairs of strip tensioning and feeding rolls, a cutter disposed between said pairs of rolls, an anvil between said pairs of rolls in opposition to said cutter and having a rounded bearing surface for deflecting the stock out of the line of feed toward said cutter and means for rocking said anvil into different angular relations in respect to said cutter about an axis in the locality of the cutting edge of said cutter and longitudinal of the direction of feed.

4. A continuous milling machine, comprising spaced pairs of strip tensioning and feeding rolls, a cutter disposed between said pairs of rolls, an anvil between said pairs of rolls in opposition to said cutter and having a rounded bearing surface for deflecting the stock out of the line of feed toward said cutter, means for rocking said anvil into different angular relations in respect to said cutter about an axis in the locality of the cutting edge of said cutter and longitudinal of the direction of feed and including an arcuate support for said anvil, an arcuate bearing for said support and screw means for locking said support on said bearing.

5. A continuous milling machine, comprising a frame, longitudinally spaced pairs of strip tensioning and feeding rolls journalled in said frame, a cutter disposed between successive pairs of said rolls in position to operate on strip stock advanced by the rolls, a transversely extending support on said frame between successive pairs of said strip tensioning and feeding rolls, a transversely adjustable endwise removable member slidingly guided on said support, said member having a stock receiving and confining groove extending across the same to register the stock with said cutter and screw means for adjustably and removably securing said grooved member in position.

FREDERICK KOCH.